Figure 1:
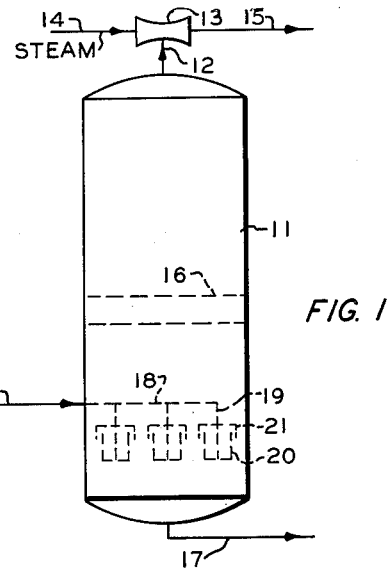

Oct. 9, 1962 — P. M. WADDILL — 3,057,786

FOAM ELIMINATING FEED DISTRIBUTOR

Filed April 27, 1959

INVENTOR.
P. M. WADDILL
BY
*Hudson & Young*
ATTORNEYS

United States Patent Office 3,057,786
Patented Oct. 9, 1962

3,057,786
FOAM ELIMINATING FEED DISTRIBUTOR
Paul M. Waddill, Bartlesville, Okla., assignor to Phillips Petroleum Company, a corporation of Delaware
Filed Apr. 27, 1959, Ser. No. 809,167
13 Claims. (Cl. 202—53)

This invention relates to a foam eliminating fluid feed distributor adapted to pass a fluid material having a tendency to foam substantially free of foam into a vessel and to a method for feeding a flash distillable feed material substantially free of foam to a vacuum flash distillation zone. In accordance with one aspect, this invention relates to a method of feeding a fluid material having a tendency to foam upon pressure release of said material into a unitary confined zone of reduced pressure by passing said material at an intermediate pressure through a small confined foam producing section of the fluid feed distributor within said reduced pressure zone. In accordance with another aspect, this invention relates to a single unitary feed distributor within a vacuum flash vessel adapted to pass a feed substantially free of foam to said vessel, said distributor having a receiver and two flow restriction sections wherein a foam is produced by the first restrictor, held in said receiver and, then, broken by the second restriction section.

In many industrial operations, foam is often encountered in the processing equipment which materially impairs the efficient operation of such equipment. Foaming of fluid materials may be caused by liberation of dissolved gases, as by agitation, the application of heat, reduction of pressure, or by chemical or other internal action within the fluid. As is well recognized, foam materially interferes with the proper flow of a fluid, particularly, in systems including pumps or other fluid translating devices and/or involving measurements as of flow or volume. Difficulties of the above character are particularly encountered in the introduction of a heated fluid material to be distilled into a distillation vessel operating at subatmospheric pressure. The formation of foam in these units takes place principally at points where the distillable material issues or is discharged into the vacuum vessel.

Accordingly, an object of this invention is to provide an improved method and apparatus for flash distillation of a distillable material.

Another object of this invention is to provide a practical and an efficient method and apparatus for the introduction of a feed material into an operational vessel operating at reduced pressure.

Another object of this invention is to provide an improved method and apparatus for introducing a feed material substantially free of foam into a vacuum flash distillation unit.

Still another object of this invention is to provide a novel and economical vacuum flash distillation vessel having a feed distributor adapted to feed material substantially free of foam into said vessel.

Other aspects, objects and the several advantages of the invention are apparent from the disclosure, the drawings and the appended claims.

According to the present invention, there is provided a method for introducing a fluid material having a tendency to foam into a processing zone operating under reduced pressure comprising conducting said material into a lower portion of an upwardly opened foam producing-breaking section within said processing zone, flowing said material through a flow restriction zone in said lower portion to partially reduce the pressure of said material and to cause said material to foam, passing said foaming material upwardly through said section at said reduced pressure, at the top of said section passing said foaming material through a second flow restriction zone and turning said material through an angle of at least 90° to further reduce the pressure of said material and to break said foam, and passing said material substantially free of foam into said zone of reduced pressure.

Also, in accordance with the present invention, there has been provided a foam eliminating fluid feed distributor for a vessel operating under reduced pressure of construction facilitating rapid and efficient elimination of foam of the feed material formed in said feed distributor comprising, in combination, a downwardly extending feed conduit having fluid flow restrictors at its outlet end to restrict the flow of feed material into a lower portion of an upwardly opened cylindrical receiver maintained at an intermediate pressure within said vessel, and a cover spaced above said receiver, preferably, having a downwardly extending lip surrounding said receiver, to provide second flow restriction opening to maintain said intermediate pressure in said receiver to break foamed material passed through said receiver and to direct the flow of non-foaming feed into said vessel.

In accordance with a specific embodiment of the present invention, a flash distillable material to be flash distilled is introduced substantially free of foam into a flash distillation zone maintained under subatmospheric pressure, said material having a tendency to foam when subjected to pressure reduction, comprising feeding said material under flash distillation conditions into a lower portion of said flash zone, passing said material to a lower portion of an upwardly extending foam producing-breaking section disposed within said zone, said section being in open communication with said zone at its top, at said lower portion of said section passing said material through a flow restriction zone to partially reduce said material pressure and form foam of said material and introducing said foam into said section, flowing foaming material upwardly through said upwardly extending section, at the top of said upwardly extending section breaking said foam by passing said upwardly rising foaming material through a second flow restriction zone and, then, introducing said material substantially free of foam into said flash zone, flash distilling said material in the lower portion of said zone forming upwardly rising flashed vapors and an unvaporized residue, withdrawing flashed vapors from an upper portion of said flash zone, and withdrawing unvaporized residue from the lower portion of said flash zone.

The foam eliminating fluid material feed distributing device of the present invention is located inside a vessel, preferably, an enclosed elongated vacuum flash distillation vessel, for the purpose of introducing a fluid material into a zone of reduced pressure substantially free of foam. The present invention reduces the pressure of the feed material in stages within the vessel by passing the feed material through two flow restriction sections of a foam pot or receiver operatively connected to the vessel feed inlet conduit. The pressure of the feed is reduced to an intermediate pressure after passage through the first flow restrictor thereby forming foam of the feed material. The foam material is then passed upwardly through the foam receiver or pot at a reduced flow rate. At the top of the foam receiver or pot, the foam is passed through a second flow restrictor to further reduce the pressure of the feed material and break the foam. After passage of the feed material through the second flow restrictor, the feed material substantially free of foam is introduced into the vessel of reduced pressure.

Figure 2:
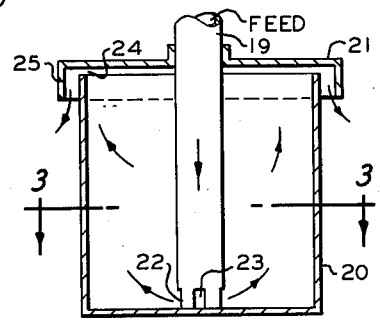
Figure 4:
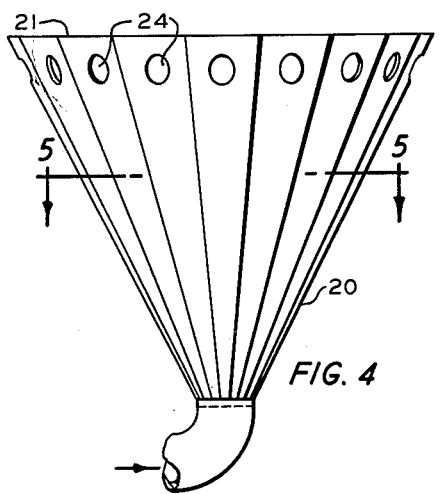
Figure 3:
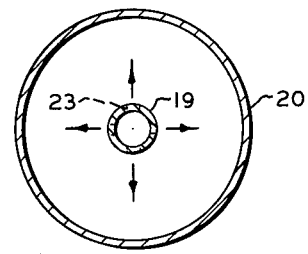
Figure 5:
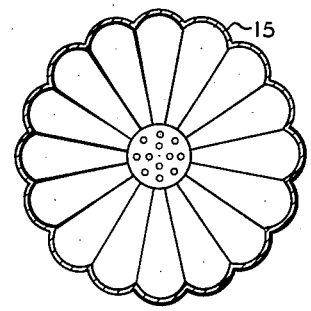

This invention will be further explained by referring to the attached drawing of which FIGURE 1 is a schematic vertical cross-section showing an embodiment of the apparatus of this invention located in the lower section of a vacuum flash distillation vessel; FIGURE 2 is a schematic vertical view of one particular embodiment of the foam producing-breaking pot or receiver of the present invention; FIGURE 3 is a top view of a horizontally-taken cross-section of the lower portion of the feed pot or receiver of FIGURE 2; FIGURE 4 is a vertical view of another embodiment of the foam producing-breaking receiver or pot of the present invention; and FIGURE 5 is a top view of a horizontally-taken cross-section of the lower section of FIGURE 4.

Referring now to FIGURE 1, a distillable material, which can be a hydrocarbon, vegetable or mineral oil, fruit juice, organic or inorganic chemical solution, etc. which has a tendency to foam upon release of pressure upon said material, is passed to vacuum distillation vessel 11 through pipe 10 which is affixed to vessel 11 at a lower portion of said vessel. In a preferred embodiment of this invention, a heavy oil, as for example, a topped crude or a residuum from a topped crude cracking operation or a mixture of such heavy oils, having been heated to a temperature required for flashing same, as, for example, 600 to 900° F., is introduced into a lower portion of flash distillation vessel 11 by way of conduit 10 through a foam eliminating feed material distributing apparatus of the present invention to be described more fully hereinafter. Elongated distillation zone 11 is generally maintained at an overall absolute pressure generally below from 0.1 to 15 mm. Hg and often as low as from 0.01 to 1.0 mm. Hg. At the upper portion or top of the distillation vessel or column 11, a flashed vapor withdrawal conduit 12 is provided. The flashed vapors are withdrawn from vacuum vessel 11 through vacuum producing means 13 by a vacuum producing medium, such as steam, introduced by means of conduit 14 into vacuum means 13. The flashed vapors, along with steam, are removed from vacuum producing means 13 by way of conduit 15 and passed to further processing, for example, condensation, and further use elsewhere, not shown.

At an intermediate portion of the elongated flash distillation vessel 11, there is provided a mist extractor 16 which can be a wire mat, baffle, etc. for removing entrainment from the flashed vapors rising through column 11. At the bottom of distillation vessel 11, conduit 17 is provided for withdrawal of unvaporized residue from the bottom of column 11 to be processed elsewhere, not shown.

Referring now to FIGURES 1 and 2, for better understanding of the feed distributor of the present invention, material to be flashed, passed to vessel 11 by way of conduit 10, is conducted within column 11 by way of conduit 18 which extends a substantial distance across column 11. Extending downwardly from horizontal conduit 18 are three equally spaced vertical pipe sections which conduct the feed material into the foam producing-breaking receiver or pot 20. It should be realized that, although three foam pots are shown in FIGURE 1, a single large, properly sized foam pot could also satisfactorily be employed or any other number desired.

The heated feed material is passed downwardly through conduit 19 into the lower portion of upwardly opened foam receiver or pot 20. The lower end of conduits 19 are normally positioned so as to rest upon the bottom of receiver 20. The cylindrical portion 22 of the end of pipe 19 has a number of ports 23 formed as notches or recesses in its lower periphery to provide for passage of the feed material through the area provided thereby. The feed material is passed radially through ports 23 into receiver or pot 20. The pressure of the feed material is reduced as it is passed through ports 23 thereby causing said feed material to foam. As noted above, foam material distributes radially out into the lower portion of receiver 20 and, then rises at a reduced flow rate toward the top of receiver 20. If desired, feed pipe 19 can enter the lower portion of receiver 20 either at its side or from the bottom so long as the feed material is passed through a flow restrictor to reduce the pressure and foam said feed.

At the top of foam pot 20, there is provided an orifice opening 24 by cover or lid 21 which is slidably fitted on conduit 19. Orifice slot 24 can be adjusted, as desired, by manually moving cover 21 to the desired position. Cover 21 preferably has a downwardly extending lip 25 to provide a U-shaped orifice at the top of receiver 20. Orifice 24 is computed to function as a critical flow orifice and to hold approximately 50 mm. Hg absolute pressure in the foam pot 20. However, it should be realized that the intermediate pressures of a broad range are contemplated, as in the present invention.

Although an adjustable cover 21 having a downwardly extending lip has been used to define a U-shaped orifice at the upper portion or top of receiver 20, it should be realized that other similar means can be utilized to effectively practice the present invention. For example, a fixed lid or cover 21 without the downwardly extending lips 25 could be advantageously utilized. Similarly, perforations to provide flow orifices could be placed either on the top 21 or near the top along the side of receiver 20, such as illustrated by FIGURE 4. Similarly, as noted in FIGURE 4, receiver 20 need not be cylindrical but could be tapered with striated sides, as illustrated in FIGURES 4 and 5. The important feature of the present invention is the passage of feed material through flow restrictors in the lower portion of a foam receiver and passing the foam upwardly through the receiver and, then, out into the vessel through flow restrictors at the top of receiver 20.

As noted above, the feed material which is foaming in receiver 20 is passed through orifice 24 wherein the foam is broken and, then, the feed is introduced into the lower portion of flash distillation vessel 11. The heated charge, upon being introduced into vessel 11, is flashed, with the highest boiling components of the charge material remaining unvaporized, these unvaporized materials comprising residual pitch which is removed by way of conduit 17. A small portion of unvaporized material is entrained in the flashed vapors as small finely-divided droplets which are removed from the rising flashed vapors by mist extractor 16. Flashed vapors are removed from flash vessel 11 by way of conduit 12.

Although the drawing has been described in some detail, it should be understood that design and construction of a unit would involve the consideration of various elements of operation and apparatus, usually provided by one skilled in the art.

To provide some detail with respect to the present embodiment of a foam eliminating feed distributor that I have used in a vacuum flash distillation vessel, receiver 20 which has a 12-inch diameter and is 3 feet long is fed by a 2½ inch feed pipe 19. Slots 23 on the outlet end of conduit 19 are 1 inch wide by ½ inch high and there are four such slots provided at the end of pipe 19. Pipe 19 is coaxially positioned in cylindrical receiver 20 and the outlet end of pipe 19 rests upon the bottom of receiver 20. A 1 inch circular orifice opening is provided between the top of receiver 20 and lid 21. Lip 25 on cover 21 extends downwardly 6 inches and there are 3 inches of clearance between the outside of receiver 20 and lip 25.

In describing the apparatus of this invention, two embodiments have been illustrated while other embodiments have been indicated. Those skilled in the art will see many changes which can be made in this apparatus without departing from the scope of this invention. For example, the drawing shows only one such feed distributor in a vertical column; however, those skilled in the art will realize that more than one such feed distributor can be employed, generally at different levels in the column, and that column need not necessarily be vertical but can also be a horizontal flash distillation vessel or other similar apparatus, preferably, operating under subatmospheric pressure.

Although my invention, in a preferred embodiment, has been described and illustrated with reference to distillation of heavy hydrocarbon oils, it is to be understood that it is not limited to the described embodiment, but that it is applied advantageously to any distillable material. Also, the specifically illustrated flash conditions, for example, temperature, pressure, etc., in the flash section are not limiting to this invention, either as to the distillation of hydrocarbon oils or to the distillation of any other distillable material charge, it being important that the feed stock is charged to the distillation chamber under flashing conditions through the foam eliminating feed distributor of the instant invention as to vaporize at least a portion of the feed.

Although I have referred to certain distillation pressure ranges, it is to be understood that my invention can be applied at any pressure under which flashing of the selected feed stock can be effected, generally a subatmospheric pressure, although higher pressure may be employed depending upon the boiling point or range of the selected feed stock, it being important in the operation of the instant invention that an intermediate pressure zone be provided within the distillation zone operating under a reduced pressure for passage of foamed feed material.

Some of the advantages of the present invention are illustrated in the following example. The reactants and their proportions and their specific ingredients are presented as being typical and should not be construed to limit the invention unduly.

EXAMPLE I

A heavy hydrocarbon oil was heated to a temperature of about 740° F. and the heated oil was introduced at the rates shown in Table I into the flash section of a vertical vacuum distillation chamber of the type illustrated in FIGURE 1 as a spray directed toward the bottom of the chamber from a conventional feed distribution device. Vacuum chamber distillation pressures, feed temperatures, product qualities for two different runs are tabulated in Table I.

Table I

| | | |
|---|---|---|
| Unit | | No. 9 vac. |
| Tower dia., ft. | | 10. |
| Demister pad height above flash zone, ft. | | 6. |

| | (A) | (B) |
|---|---|---|
| Flash zone, mm. Hg Abs. | 2 | 7 |
| Feed Temp., °F. | 740 | 732 |
| Vac. Go, B/H | 70 | 64 |
| Load B/H Ft.² | 0.9 | 0.8 |
| Vapor Velocity, Ft./Sec. | 62 | 16 |
| Vac. Go, °API 60/60°F. | 23 | 24.6 |
| C. Res., Wt. Percent | 0.9 | 0.4 |
| Color, NPA | ¹ 6.5 | 8 |

¹ Dil.

The above-described vacuum chamber was also utilized to process a similar feed under substantially the same conditions as (A) noted above but with the foam eliminating feed distributor described in connection with FIGURE 2 and a product vacuum gas oil was obtained having an NPA color of 5. It can be seen that, by eliminating foam in the feed distributor and flash section of the vacuum unit, product quality was materially improved. The carbon residue content was 0.3 weight percent. The volume of clean vacuum gas oil so produced was 70 barrels per hour. The pressure in zone 20 was 50 mm Hg abs.

It can be seen, when operating in accordance with my invention, that a clean distillate is produced; that is, the vacuum distillate has less entrainment of the residuum portion (as shown, e.g., by the carbon residue contents) when using my invention than when operating without my invention. This cleaner oil is particularly desired for charging to catalytic cracking operations as will be understood by those skilled in the refining arts.

Reasonable variation and modification are possible within the scope of the foregoing disclosure, drawings and the appended claims to the invention, the essence of which is that there have been provided method and apparatus for efficiently introducing a material having a tendency to foam upon pressure release substantially free of foam into a vacuum distillation zone by introducing the feed material into the lower portion of an upwardly opened feed receiving section through a flow restriction zone to cause said material to foam, and passing said foaming material upwardly through said section, and at the top of said section passing said foamed material through a second flow restriction zone to break the foam and, then, introduce the material into the flashing zone, as described; apparatus providing features according to the invention, as set forth and described, permitting efficient operation, as set out herein.

I claim:

1. A method for introducing a flash distillable feed material having a tendency to foam upon pressure release into a vacuum flash distillation zone comprising conducting said material into a lower portion of an upwardly opened foam producing-breaking section within said zone, flowing said material through a flow restriction zone in said lower portion to partially reduce the pressure of said material and to cause said material to foam, passing said foaming material upwardly through said section at said partially reduced pressure, at the top of said section passing said foaming material through a second flow restriction zone while turning said material through an angle of at least about 90° to further reduce the pressure of said material and to break said foam, introducing said material substantially free of foam into said zone, and flash distilling said material in said zone to produce flashed vapors and an unvaporized residue.

2. A method for introducing a flash distillable feed material having a tendency to foam upon pressure release into a vacuum flash distillation zone comprising conducting said material downwardly into a lower portion of an upwardly opened foam producing-breaking section within said zone, radially distributing said material through a flow restriction zone into said lower portion of said section to partially reduce the pressure of said material and to cause said material to foam, passing said foaming material upwardly through said section at said partially reduced pressure, at the top of said section passing said foaming material through a second flow restriction zone while turning said material through an angle of at least about 90° to further reduce the pressure of said material and to break said foam, introducing said material substantially free of foam into said zone, and flashing said material in said zone to produce flashed vapors and an unvaporized residue in said zone.

3. A method for introducing a distillable material to be flash distilled having a tendency to foam upon pressure release into a vacuum flash distillation zone comprising feeding said material under flash distilling conditions into a lower portion of said flash zone, passing said material downwardly into a lower portion of an upwardly extending foam producing-breaking section within said zone, said section being in open communication with said zone at its top, at the bottom of said section radially distributing said feed material through a flow restriction zone into said section to partially reduce the pressure of said material and to cause said material to foam, flowing foaming material upwardly through said section at said partially reduced pressure, at the top of said section breaking said foam by passing said foaming material through a second flow restriction zone while turning said material through an angle of approximately 180° and, then, passing said material substantially free of foam downwardly into the lower portion of said flash zone, flashing said material forming upwardly rising vapors and an unvaporized residue in said zone, withdrawing vapors from an upper portion of said zone and withdrawing an unvaporized residue from a lower portion of said zone.

4. In a vacuum distillation vessel wherein a flash distillable material which has a tendency to foam upon pressure release is to be flash distilled, the improvement comprising a foam eliminating feed distributor within said vessel comprising, in combination, a feed conduit having a fluid flow restrictor at its outlet end opening into a lower portion of an upwardly opened foam receiver maintained at an intermediate pressure within said vessel, and a cover spaced above said receiver to provide a flow restrictor opening at the top of said receiver to maintain said intermediate pressure, break said foam and to direct flow of non-foaming feed into said vessel.

5. In a vacuum distillation vessel wherein a flash distillable material which has a tendency to foam upon pressure release is to be flash distilled, the improvement comprising a foam eliminating feed distributor within said vessel comprising, in combination, a downwardly extending feed conduit notched on the periphery of its outlet end to provide a flow restriction radial passage of feed into the bottom of an upwardly opened foam receiver maintained at an intermediate pressure within said vessel, and an adjustable cover spaced above said receiver to provide a flow restriction opening at the top of said receiver for directing flow of non-foaming feed into said vessel for flash distillation.

6. An apparatus according to claim 5 wherein said downwardly extending feed conduit extends coaxially into said receiver and the outlet end of said conduit rests on the bottom of said receiver.

7. In a vacuum flash distillation vessel wherein a flash distillable material which has a tendency to foam upon pressure release is to be flash distilled, the improvement comprising a foam eliminating feed distributor within said vessel comprising, in combination, a downwardly extending feed conduit notched on the periphery of its outlet end to provide a flow restriction radial passage of feed into the bottom of an upwardly opened foam receiver maintained at an intermediate pressure within said vessel, and an adjustable cover spaced above said receiver having a downwardly extending lip surrounding said receiver to provide a U-shaped flow restriction opening at the top of said receiver for breaking said foam and for directing flow of non-foaming feed downwardly into said vessel for flash distillation.

8. An apparatus according to claim 7 wherein said feed conduit extends coaxially downwardly into said receiver and the outlet end of said conduit rests on the bottom of said receiver.

9. An apparatus for flash distilling a distillable liquid material which comprises, in combination, an enclosed shell, means in an upper portion of said shell for withdrawal of flashed vapors, means in a lower portion of said shell for withdrawal of unvaporized residue, an opening at a lower portion of said shell for admitting said liquid material, feed distributor means in the lower portion of said shell in communication with said opening comprising a downwardly extending feed conduit notched on the periphery of its outlet end to provide a flow restriction radial passage of feed into the bottom of an upwardly opened foam receiver maintained at an intermediate pressure within said vessel and a cover spaced above said receiver to provide a flow restriction opening at the top of said receiver for breaking said foam and for directing flow of non-foaming feed to be flash distilled into the lower portion of said vessel.

10. An apparatus according to claim 9 wherein said feed conduit extends coaxially into said receiver and the outlet end of said conduit rests on the bottom of said receiver.

11. An apparatus for flash distilling a distillable material having a tendency to foam upon pressure release which comprises, in combination, an enclosed shell, means in an upper portion of said shell for withdrawal of flashed vapors, means in a lower portion of said shell for withdrawal of unvaporized residue, an opening at a lower portion of said shell for admitting said liquid material, a foam eliminating feed material distributing means in communication with said opening comprising, in combinaton, horizontal conduit means extending into a lower portion of said vessel, a plurality of spaced downwardly extending conduits freely in communication with said horizontal conduit, each said downwardly extending conduit being notched around the periphery of its outlet end, and said outlet end terminating at the bottom of an upwardly opened foam receiver, said receiver providing an intermediate pressure chamber within said vessel for foamed feed material formed by feed material passing radially through said notches into said receiver, and a cover for each said receiver spaced above said receiver to provide a flow restriction opening at the top of said receiver to break foam feed and to direct the flow of non-foaming feed to be flash distilled into said vessel.

12. An apparatus according to claim 11 wherein said each vertical conduit extends coaxially into said receiver and the outlet end of said vertical conduit rests on the bottom of said receiver.

13. An apparatus according to claim 11 wherein said cover for said receiver has a downwardly extending lip surrounding said receiver to provide a U-shaped flow restriction opening at the top of said receiver.

References Cited in the file of this patent

UNITED STATES PATENTS

| | | |
|---|---|---|
| 1,867,136 | Campbell | July 12, 1932 |
| 1,883,656 | Estock | Oct. 18, 1932 |
| 1,942,598 | Hewgley | Jan. 9, 1934 |
| 2,037,145 | Palermo | Apr. 14, 1936 |
| 2,206,507 | Kuhni | July 2, 1940 |
| 2,231,544 | McCorquodale et al. | Feb. 11, 1941 |
| 2,500,194 | McConnell et al. | Mar. 14, 1950 |
| 2,759,882 | Worthen et al. | Aug. 21, 1956 |
| 2,809,923 | Hausch | Oct. 15, 1957 |
| 2,868,714 | Gilmore | Jan. 13, 1959 |
| 2,897,147 | Lely et al. | July 28, 1959 |
| 2,952,362 | Oertling | Sept. 13, 1960 |